United States Patent [19]

Marchi

[11] Patent Number: 5,483,051
[45] Date of Patent: Jan. 9, 1996

[54] LASER BAR CODE READER MEASURING PHASE OF THE PULSE LASER TO DETERMINE THE DISTANCE

[75] Inventor: Paolo Marchi, Imola, Italy

[73] Assignee: Datalogic S.p.A., Lippo Di Calderara Di Reno, Italy

[21] Appl. No.: 327,749

[22] Filed: Oct. 24, 1994

[30] Foreign Application Priority Data

Nov. 4, 1993 [IT] Italy ................................ B093A0440

[51] Int. Cl.⁶ .................................................. G06K 7/10
[52] U.S. Cl. ........................ 235/462; 235/472; 356/5.1
[58] Field of Search ........................ 235/462, 472; 356/5.1, 5.11

[56] References Cited

U.S. PATENT DOCUMENTS 4,877,949  10/1989  Danielson et al. .................. 235/462
5,256,864  10/1993  Rando et al. ...................... 235/462
5,426,288   6/1995  Obata et al. ...................... 235/462

FOREIGN PATENT DOCUMENTS

27182  1/1990  Japan.

*Primary Examiner*—John Shepperd
*Assistant Examiner*—Michael G. Lee
*Attorney, Agent, or Firm*—Guido Modiano; Albert Josif

[57] ABSTRACT

A laser bar code scanner is disclosed using a pulse laser and phase detector for returned light to determine the distance of a bar code. Also, disclosed the use of several lasers having different focal distances with the determined distance being used to select appropriate laser to increase the working distance of the scanner.

6 Claims, 6 Drawing Sheets

LASER BAR CODE READER MEASURING PHASE OF THE PULSE LASER TO DETERMINE THE DISTANCE

BACKGROUND OF THE INVENTION

The present invention relates to a reader device (hereinafter termed "laser scanner" for the sake of brevity) for reading characters with different reflectance values, such as for example bar codes.

The use is known of two or more lasers, suitable to be focused at different distances, inside a single scanner, so as to increase the depth of field for the reading distance in bar code readers. An example of this technique is described in European Patent Application published on Apr. 15, 1992 under Serial No. 0480348.

In the known system, the lasers related to the various distances are activated sequentially and alternately, one for each scanning operation, and if one scan is found to contain the code, all subsequent scans are performed by the same laser, until the code remains present; once this situation ends, scanning resumes with cyclic alternation of the lasers.

Another known method entails the activation of the laser related to the reading distance by measuring, by means of a barrier of photocells external to the scanner, the height of the object that bears the code to be read.

These systems have drawbacks: in the first case, the actual scan rate is equal to the real scan rate divided by the number of lasers being scanned; the second method requires the use of external photocells and is furthermore effective only if the objects on which the code is placed have a regular shape. A defect of both systems is that only one focusing is possible during an individual scan. In other words, it is not possible to simultaneously read two codes that are aligned but located on planes that are at different distances from the scanner.

SUMMARY OF THE INVENTION

The aim of the present invention is to provide a scanner for reading characters with different reflectance values, such as for example bar codes, which can activate, automatically and in real time, the laser focused at the distance that matches the instantaneous position of the spot at any time during the scan.

This aim is achieved by a laser scanner, the characteristics whereof are defined in the appended claims.

BRIEF DESCRIPTION OF THE DRAWINGS

Further characteristics of the invention will become apparent from the following detailed description on the basis of the accompanying drawings, wherein.

DESCRIPTION OF THE PREFERRED EMBODIMENTS

Figure 1:
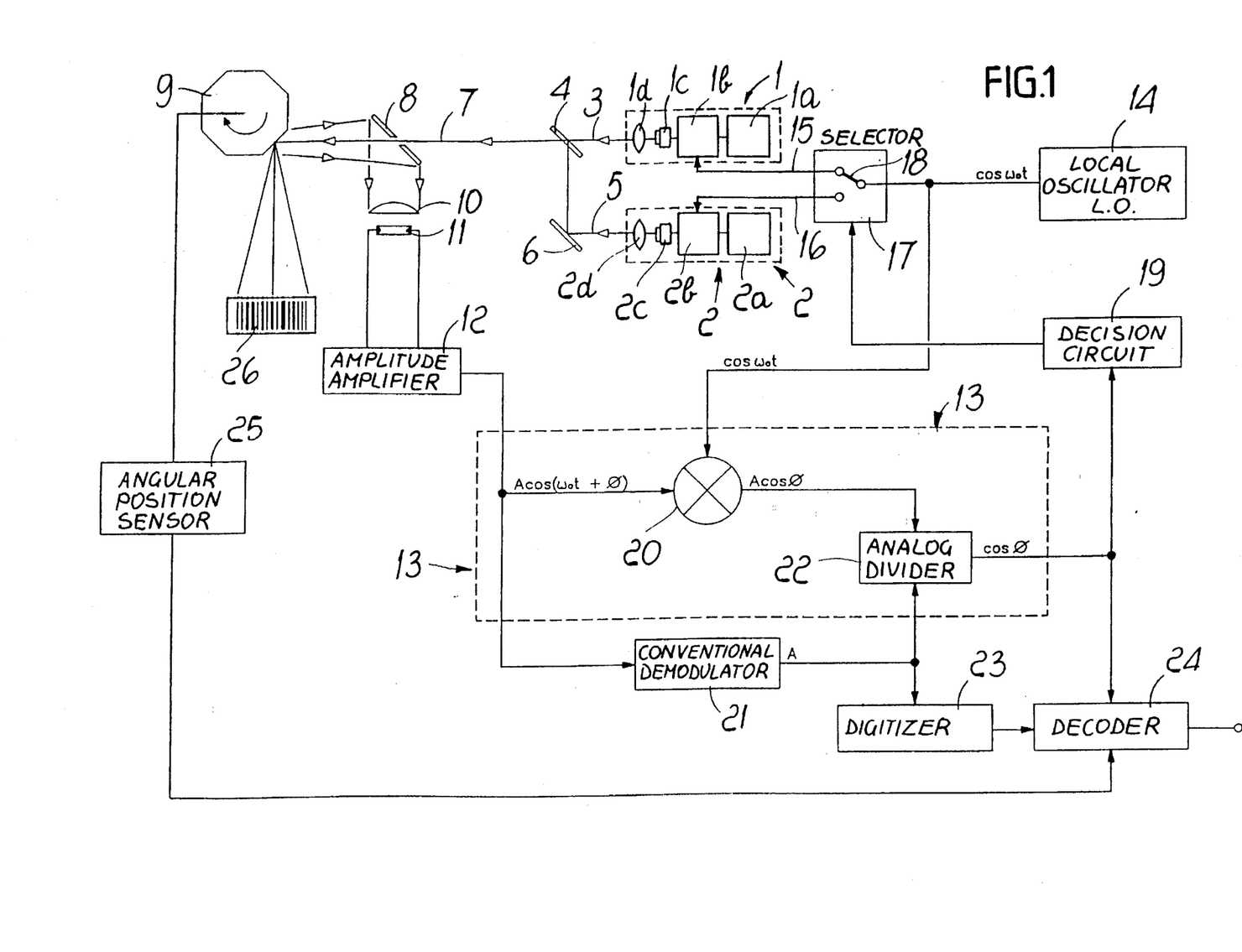
FIG. 1 is a block diagram of a scanner with two laser units.

With reference to FIG. 1, the scanner comprises two perfectly identical laser beam source units 1 and 2; each unit is composed of a power supply circuit 1a, 2a and of a modulating circuit 1b, 2b that activates modulated emission only when a high-frequency modulating signal is present at its input. Each source unit 1, 2 furthermore includes a laser diode 1c, 2c connected to the output of the modulating circuit 1b, 2b and an optical assembly 1d, 2d for variable collimation, such as to allow the focusing of the emitted beam at different distances. In the example of FIG. 1, one assembly focuses the emitted beam onto a nearer region or reading field and the other assembly focuses it onto a more distant reading field. Conveniently, the two reading fields have an overlapping region in order to ensure the necessary continuity of the region to be scanned.

The beam 3 arriving from the optical assembly 1d is sent through a semitransparent mirror 4. In the same manner, the beam 5 from the optical assembly 2d is reflected by the mirror 6 onto the semitransparent mirror 4; the mirrors 4 and 6 are orientated so that the beams 3 and 5 that leave the mirror 4 have the same direction, so as to produce a unidirectional beam 7.

The unidirectional beam 7 is directed onto a polygonal rotor 9 through the hole of a mirror 8 arranged obliquely with respect to said beam. Said rotor 9 comprises multiple peripheral mirrors which, by means of the rotation of the rotor, scan a preset reading area in which the characters to be read, e.g. a bar code, are located.

The beam reflected by the reading area is reflected by said rotor 9 and by the mirror 8 towards an optical receiving system 10 that concentrates the light on a photoelectric sensor 11 which converts the light signal into an electric signal. The amplifier 12 amplifies said electric signal until it reaches a level sufficient for subsequent processing. The signal at the output of the amplifier 12 is sent to a phase demodulator 13.

The modulation signal is produced by a local oscillator 14 and is sent to the laser unit 1 (signal 15) or to the laser unit 2 (signal 16), depending on the position assumed by a selector 17.

The modulating signal produced by the local oscillator 14 has a sinusoidal plot that follows the rule $\cos(\Omega_o t)$ at a high frequency, for example 40 MHz.

The selector 17 comprises an analog switch 18 which, depending on a signal that arrives from a decision circuit 19, connects the oscillator 14 to the laser unit that is focused on the distance of the bar code.

The beam emitted by the laser unit 1 or 2 and modulated according to the rule $\cos(\Omega_o t)$, after being scanned in a cyclic manner over the reading area and reflected onto the amplifier 12, is present at the output thereof as a signal whose carrier frequency is the same modulation frequency as that of the laser beam and contains, as amplitude modulation, the signal due to the differences in reflectance of the point of the surface struck by the beam (scanning spot), phase-shifted in proportion to the time required to cover the sum of the distances between the laser unit 1 or 2 and the reflection surface and between the reflection surface and the sensor 11.

Accordingly, at the output of the amplifier 12 a signal $A\cos(\Omega_o t + \Phi)$ is obtained, where A is the amplitude of the signal indicating reflectance, $\Omega_o$ is the pulse of the modulating signal and $\Phi$ is the phase shift angle of the received signal with respect to the modulating signal.

The modulating signal $\cos(\Omega_o t)$ arriving from the local oscillator 14 and the signal at the output of the amplifier 12, $A\cos(\Omega_o t+\Phi)$, are sent to a mixer 20 of the phase demodulator 13, which is in practice a synchronous demodulator that can provide an output signal $A \cos \Phi$.

The same signal $A\cos(\Omega_o t+\Phi)$ is sent to an amplitude demodulator 21 that extracts its amplitude characteristic A.

Analog signals are present at the output of the mixer 20 and of the amplitude demodulator 21; these signals, sent to am analog divider 22, provide, at the output thereof, a signal which is proportional to $\cos \Phi$.

The signal A is furthermore sent to a digitizer 23, where it is converted into pulses the duration of which corresponds to the variations in reflectance.

The output of the digitizer 23 is connected to a decoder 24 which receives the signal $\cos \Phi$ from the analog divider 22.

The decoder 24 also receives a signal processed by an angular position sensor 25 which is associated with the rotor 9.

The sensor 25 detects the beginning of each scanning step and allows the decoder to provide in output the information related to the angular position (distance) of the reflectance area (represented by the signal $\cos \Phi$ at the output of the analog divider 21) and to the variations (represented by the signal A at the output of the digitizer 23) in relation to the angular position of the beam that scans the reading area.

As mentioned initially, the laser units 1, 2 are preset to focus the emitted beams onto two adjacent fields which form the reading area by mutually integrating along an overlapping region. In order to determine which one of the two laser units 1, 2 must remain activated (i.e. with modulation present) in the reading field where the characters to be read are present, the signal $\cos \Phi$ is sent not only to the decoder 24 but also to the decision circuit 19, which is substantially a comparator that compares said signal $\cos \Phi$ with a reference value corresponding to the region of separation (overlap) between the two focusing fields of the laser units 1, 2. On the basis of this comparison, the signal at the output of the circuit 19 presets the selector 17 for the activation of one or the other of the laser units 1, 2.

The described scanner is particularly suitable for reading the bar codes 26 applied to products meant for distribution. If the local oscillator 14 emits a 40-MHz modulating signal having a corresponding wavelength of 7.5 meters, the return signal reflected by the bar code 26 will be back in phase with the emitted signal every 7.5 meters.

Taking into account the fact that the optical path is double, the useful working field is halved and then again halved by providing only a phase shifting up to 180°. A working field of approximately 1.8 meters is thus obtained: such a field is four times shorter than the wavelength and constitutes a wide enough value within which the codes to be read must be kept with respect to the scanner.

The operation of the scanner according to the invention, although evident from the above description, is as follows.

Assume that the laser unit 1 is preset to focus onto a reading field closer to the scanner than the field for which the laser unit 2 is preset. If the selector 17 is in the position for connecting the oscillator 14 to the laser unit 1 and the bar code 26 is in the reading field of the laser unit 1, the spot of the beam emitted by the laser unit 1 is correctly focused and at the output of the amplifier 12 a signal $A\cos(\Omega_o t+\Phi)$ is obtained which, once processed by the phase demodulator 13, provides the decision circuit 19 with a signal which, when compared with the reference signal, allows the circuit 19 to process a signal that can keep the selector 17 in the position for connecting the oscillator and the laser unit 1. Throughout this connection, the analog signal A corresponding to the code that has been read reaches the digitizer 23 and starting therefrom, in pulse form, reaches the decoder 24 together with the phase shift signal $\cos \Phi$ arriving from the divider 22 and with the angular position signal arriving from the sensor 25.

If the code 26 is not in the focusing field of the laser unit 1, the signal $\cos \Phi$ at the output of the demodulator 13 causes the processing of a signal that can switch the selector 17 and allow the modulation of the laser beam emitted by the unit 2, which is focused onto the field in which the code 26 is present. The steps then follow one another in the above described manner.

In the practical execution of the device, the mixer 20 is constituted by a PMB2330 integrated circuit produced by the German company Siemens AG.

Figure 2:
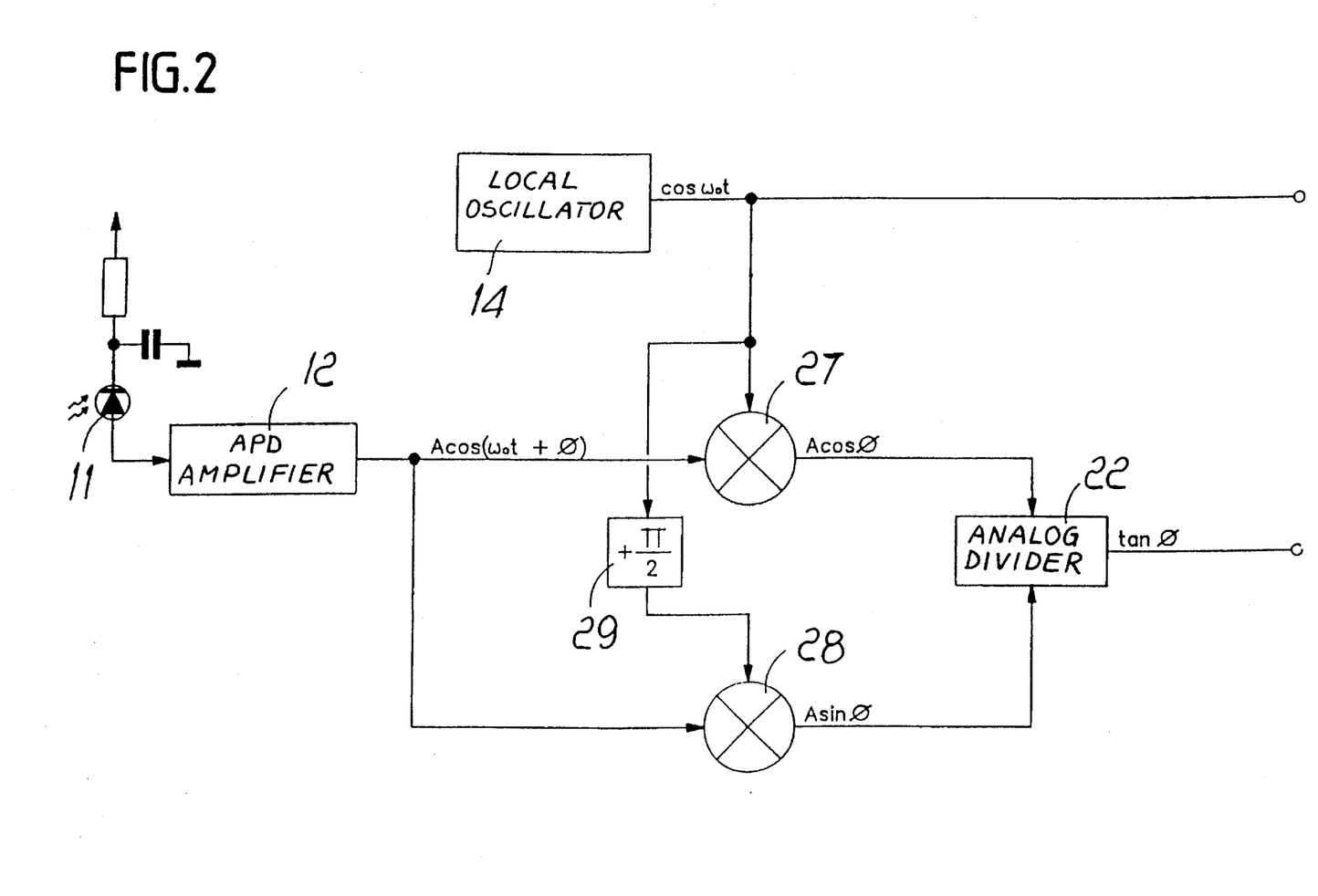
FIG. 2 is a block diagram of a modified detail of the scanner of FIG. 1.

FIG. 2 illustrates an embodiment of the phase demodulator 13, which consists of two mixers 27 and 28, the inputs of which receive the signal $A\cos(\Omega_o t+\Phi)$ provided by the amplitude amplifier 12. While the mixer 27 receives the modulating signal with the rule $\cos(\Omega_o t)$, the mixer 28 receives the same signal advanced by $\pi/2$ by the circuit 29, i.e. $\sin(\Omega_o t)$.

Accordingly, the signal $A\cos\Phi$ is present at the output of the mixer 27 and the signal $A\sin\Phi$ is present at the output of the mixer 28. These signals are processed by the analog divider 22 into the output signal $\tan\Phi$, i.e. again a signal which is a function only of the phase shift angle matching the distance between the code 26 and the scanner.

Figure 3:
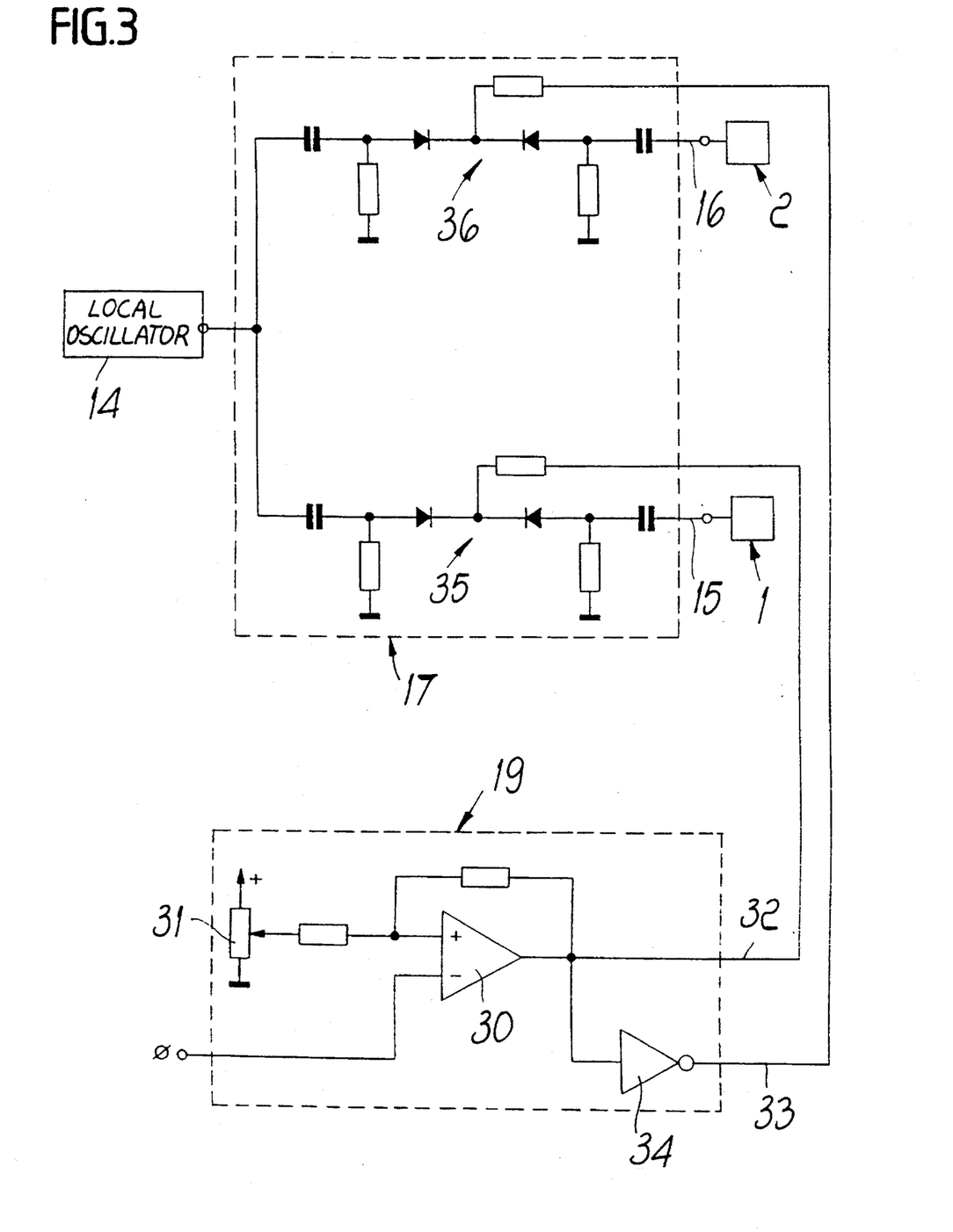
FIG. 3 is a diagram of a detail of the scanner of FIG. 1.

FIG. 3 illustrates a possible embodiment of the decision circuit 19 and of the switch 17. The inputs of the operational amplifier 30 are connected to a circuit 31 for providing a reference signal, and respectively to the phase shift signal $\cos\Phi$. The output of the operational amplifier 30 provides a direct signal at the output 32 and an inverted signal, produced by a NOT logic gate 34, at the output 33.

The direct and inverted signals, depending on their polarity, respectively switch on and off the two switching circuits 35 and 36 connecting the local oscillator 14 to the laser units 1, 2. The switching circuits can be provided, for example, with devices that are commercially known by the code PSW1211 and are manufactured by the US company MiniCircuits.

The invention is susceptible to numerous modifications and variations, all of which are within the scope of the inventive concept.

Figure 4:
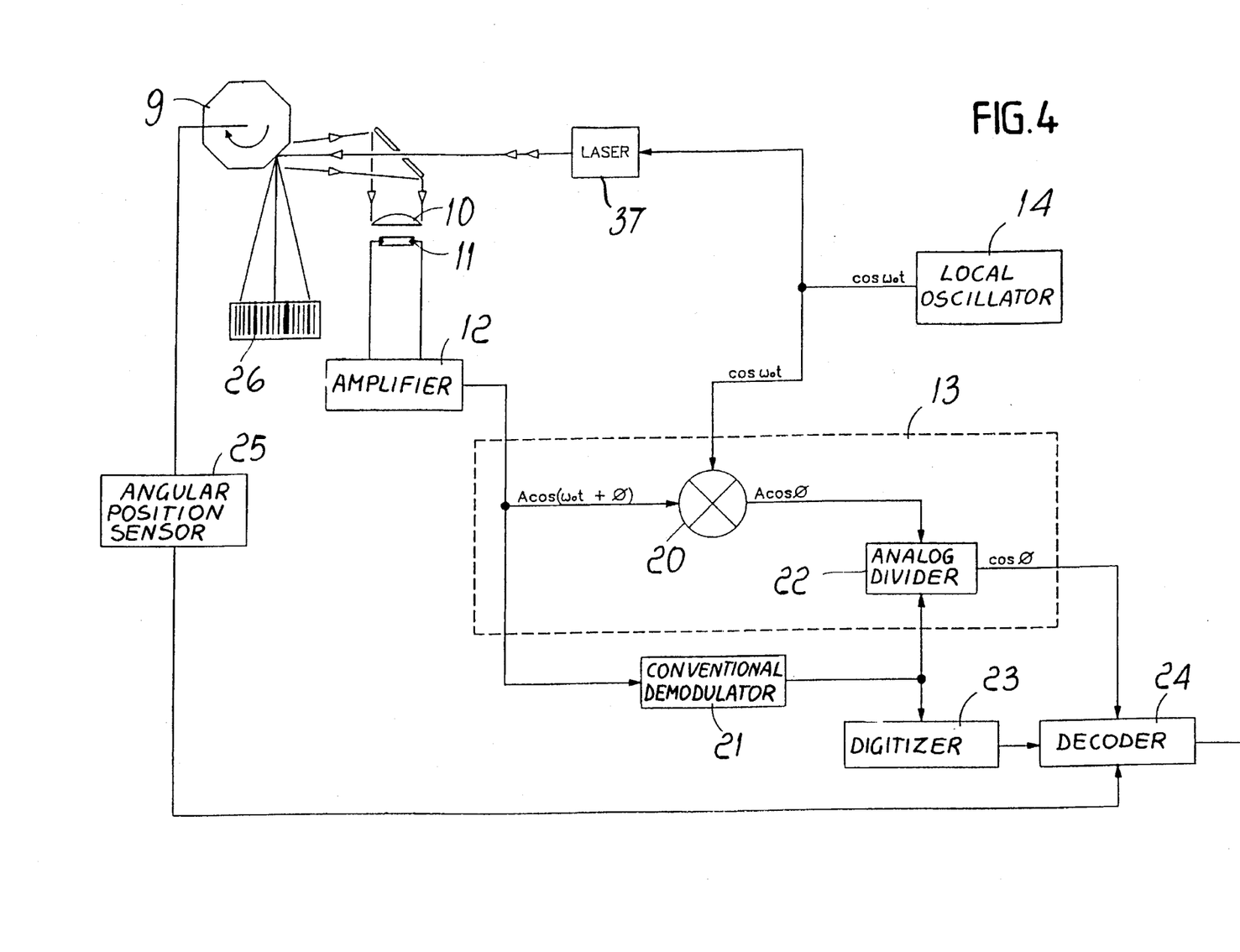
FIG. 4 is a block diagram of a scanner provided with one laser unit.

FIG. 4 is the block diagram of a scanner having a single laser unit 37. In this case, the laser unit 37 is modulated directly and continuously by the signal $\cos(\Omega_o t)$ arriving from the local oscillator 14. In this case, the distance-indicating signal $\cos\Phi$ is used only to provide information to the decoder as to the distance of the scanner from the code.

A scanner according to this configuration can be used not only to read codes but also to measure the distance and position of objects and codes located in the space covered by the scan.

Figure 5:
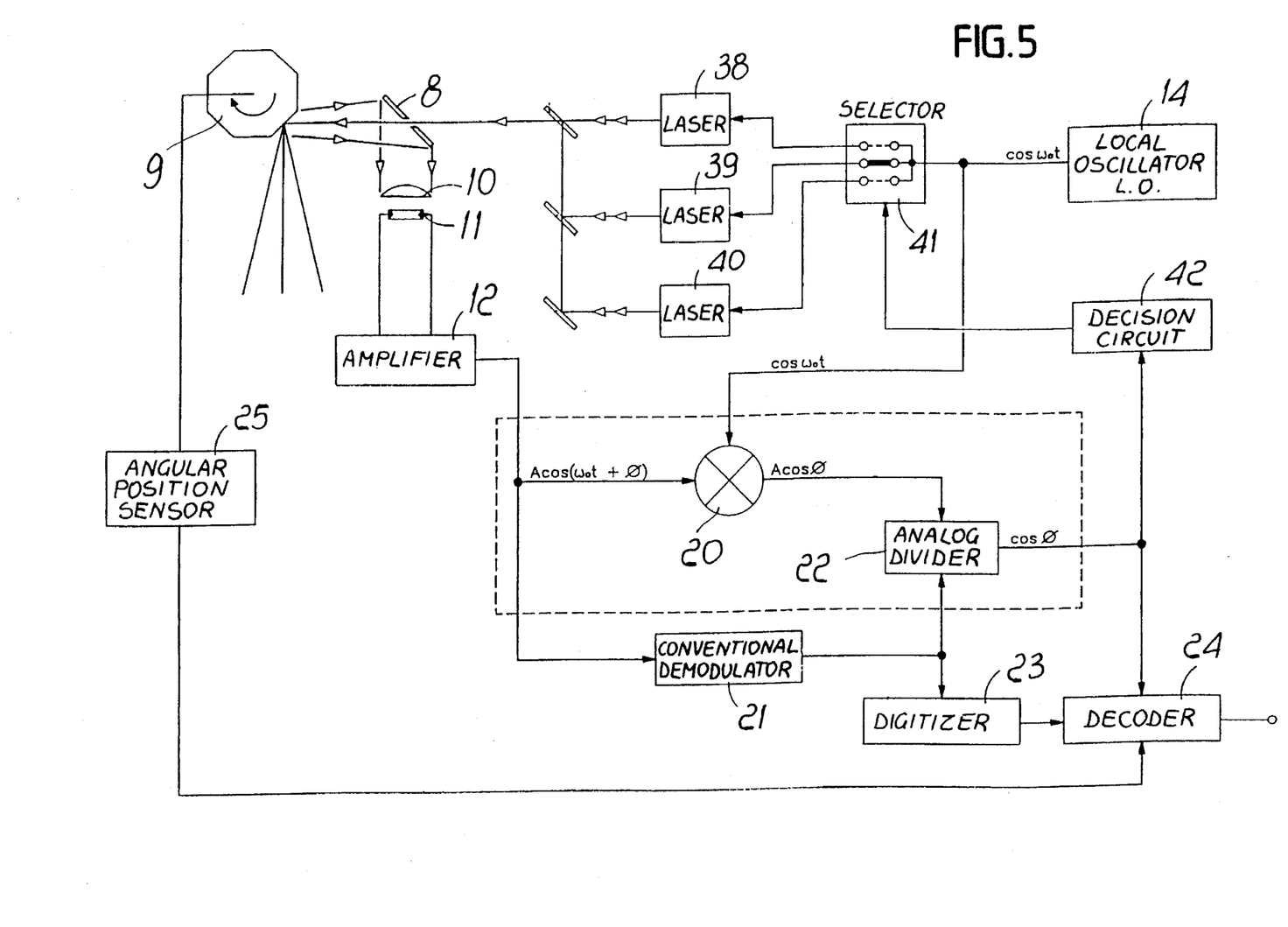
FIG. 5 is a block diagram of a scanner with three laser units.
Figure 6:
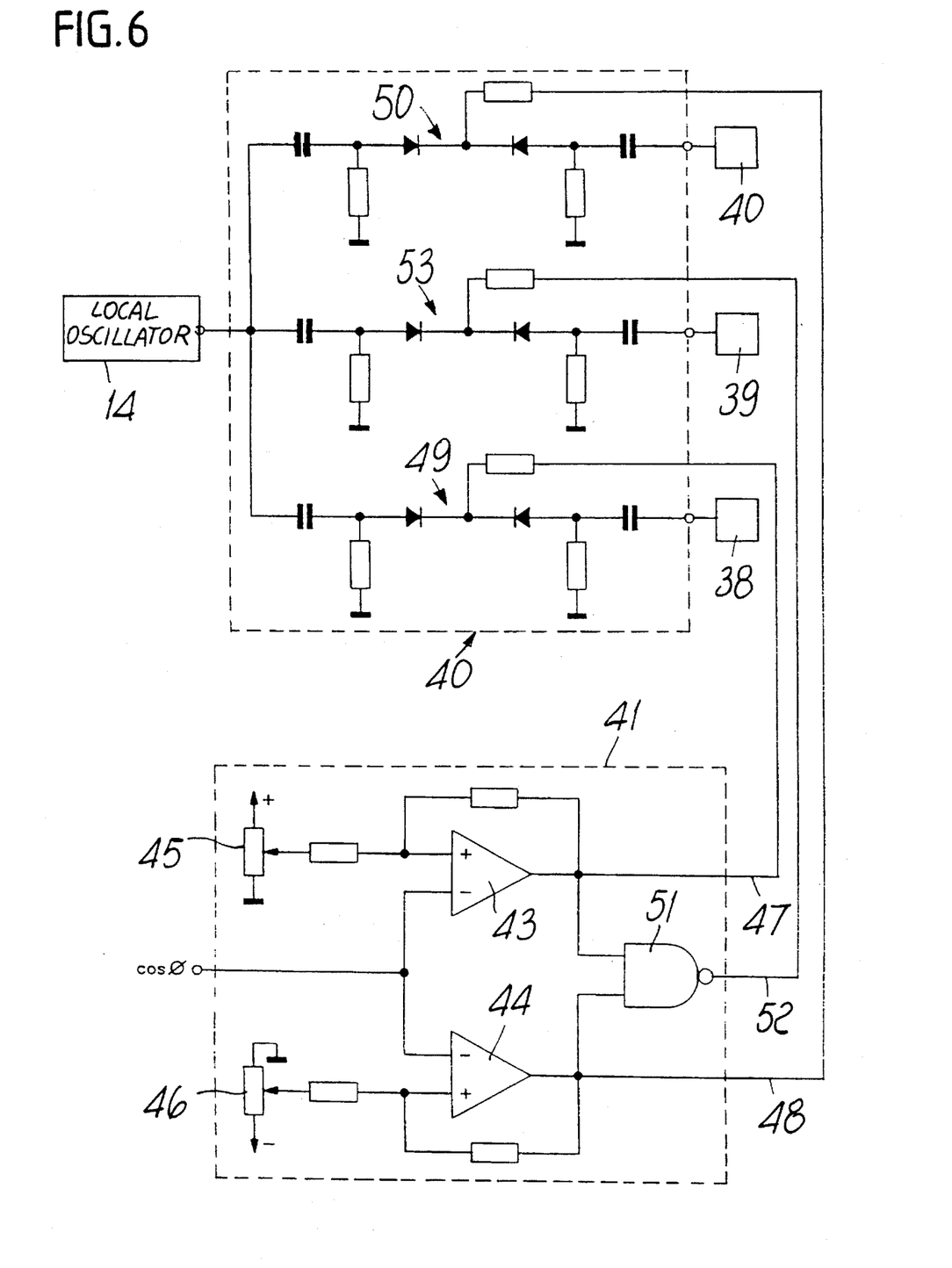
FIG. 6 is a diagram of a detail of the scanner of FIG. 5.

FIG. 5 is a block diagram of a scanner with three laser, units 38, 39 and 40 for reading three fields: close, intermediate and distant. The selector 41 and the decision circuit 42 are accordingly designed for three outputs and two reference distance thresholds respectively. The associated decision circuit 42 and selection circuit 41 are illustrated in FIG. 6. In particular., the decision circuit 42 comprises two operational amplifiers 43 and 44 having a first input connected to a respective circuit 45, 46 that provides a positive or negative reference signal and a second input connected to the phase shift signal cos Φ. The outputs 47, 48 of the operational amplifiers 43, 44 are connected to the switching circuits 49, 50 which are related to the laser units 38, 40 for focusing onto the outermost reading fields. Said outputs 47, 48 are connected to the inputs of a NAND logic gate 51, at the output 52 of which there is a signal only in the presence of a signal on one of the outputs 47 and 48. Accordingly, the signal at the output 52 connected to the switch 53 related, to the laser unit 39 allows to focus the laser beam on the code which is located in an intermediate reading field.

In a further embodiment, as an alternative to the decoder means there are C.P.U. (Central Processing Unit) means providing data equivalent to the distance from the scanner of the objects that are in its measurement field, independently of the presence or absence of bar codes or other similar symbols.

It is also possible to provide a scanner having a single laser diode and using the techniques according to the present invention. Said scanner will be able to read codes with the depth of field of a single laser, but will also be able to report, in addition to the code it has read, the distance of the code from the scanner.

What is claimed is:

1. Laser scanner for reading characters printed with different reflectance values, particularly bar codes, comprising:

at least two laser beam source units, each one provided with optical means for focusing the beam of one unit onto a near region and the beam of the other unit onto a distant region, said optical means being such that the beam generated by each unit coincides, in terms of direction and position, with the beam generated by the other unit, said near and distant regions forming said reading area and overlapping in an intermediate region;

optical scanning means for periodically directing the coincident beam onto a reading area that contains said code;

optical receiving means for collecting the light that returns from the scanning of the code and for providing an optical signal;

sensor means for converting the optical signal into an electric signal;

amplifier means connected to said sensor means and suitable to provide, in output, an amplitude signal that is proportional to the light received by the sensor means;

two independent power supply and modulation circuits, each one coupled to one of said laser units and having an input for a modulating signal of preset frequency;

a local oscillator for generating said modulating signal of preset frequency;

a selector for sending said modulating signal to one or the other of said power supply circuits so that it emits a signal modulated at the frequency of said local oscillator;

a phase demodulator for measuring the phase difference between the signal received from said amplifier means and the signal of said local oscillator, the result of this phase demodulation being a signal that indicates the distance between the reading field scanned by the laser beam at that exact instant and said scanner;

comparator means for comparing said distance signal to a reference signal that is equivalent to the distance of said intermediate region from said scanner and for providing signals suitable to activate, in real time, said selector into the position for activating the laser unit that is focused on the region containing the code;

amplitude demodulation means connected to said amplifier means and providing a signal that is equivalent to the code that has been read;

digitizer means connected to said amplitude demodulation means and providing pulses the duration of which matches the symbols of the code that has been read;

decoder means connected to said digitizer means and to said phase demodulator and providing data that are equivalent to the content of the code that has been read and to its distance from the scanner.

2. Laser scanner according to claim 1, wherein the frequency of the local oscillator is such that the corresponding wavelength is equal to, or slightly higher than, four times the maximum operating distance of said scanner.

3. Laser scanner according to claim 1, wherein it comprises three laser units focused on three regions located at a close, intermediate and remote distance from said scanner.

4. Laser scanner according to claim 3, wherein the switching circuit is capable of driving said modulating signal only on one of said three laser units at a time, and in that said comparison means are capable of comparing said distance signal with two reference values corresponding to the distances of the separation areas of said three regions.

5. Laser scanner for reading characters printed with different reflectance values, particularly a bar code, comprising:

means for emitting a laser beam;

optical scanning means for periodically directing the laser beam onto the scanning region;

optical receiving means for directing the light that returns from the scan onto:

sensor means for converting the light intensity variation into electric signals;

amplifier means connected to said sensor means and suitable to provide an electric signal, the amplitude of which is proportional to the amplitude of the light received by said sensor means;

a phase demodulator that can measure the phase difference between the signal received from said amplifier means and a signal of a local oscillator, the result of this phase demodulation being a signal indicating the distance between the plane scanned by the laser beam at that exact instant and said scanner;

amplitude demodulation means connected to said amplifier means and providing an amplitude signal that is equivalent to the reflectance of the code that has been read;

digitizer means connected to said amplitude demodulation means and providing pulses the duration of which matches the code that has been read;

decoder means connected to said digitizer means and to said phase demodulator and providing data that are equivalent to the content of the code that has been read as well as information on its distance from the scanner;

C.P.U. (Central Processing Unit) means, as an alternative to said decoder means, for providing data that are equivalent to the distance between the scanner and the objects that lie within its measurement field, independently of whether they contain bar codes or other symbols.

6. Method for reading a bar code or other symbol based on elements having different reflectance by means of:

the periodic scanning of a laser beam along a certain direction or path;

the modulation of said laser beam at such a frequency that its wavelength is at least equal to four times the maximum reading field;

the reception of the light reflected by the support of S said code or symbol and the conversion thereof into an electric signal, by means of a photoelectric sensor and an associated amplifier, said electric signal being constituted by a waveform in which the modulating frequency and the amplitude depend on the reflectance of said symbol or code;

the measurement of the distance between the scanner and said symbol or code by the phase demodulation of said electric signal with respect to the phase of said modulating signal;

the comparison of said distance-indicating phase signal by means of a comparator with one or two thresholds and a single-pole, double- or triple-throw switch to activate, among the lasers present in said scanner, the one focused in the correct distance field;

the amplitude demodulation of said electric signal to obtain a signal representing said code or symbol;

the digitizing of said representative signal to obtain pulses corresponding to said code or symbol;

the decoding of said pulses so as to obtain information related to the content of said code or symbol and to its distance from said scanner.

* * * * *